United States Patent [19]

LeClair

[11] Patent Number: 4,571,876

[45] Date of Patent: Feb. 25, 1986

[54] ICE FISHING DEVICE

[76] Inventor: Louis LeClair, 124 Ash Swamp Rd., W. Scarborough, Me. 04074

[21] Appl. No.: 639,503

[22] Filed: Aug. 10, 1984

[51] Int. Cl.⁴ ............................................. A01K 97/12
[52] U.S. Cl. ........................................................ 43/17
[58] Field of Search ...................................... 43/17, 16

[56] References Cited

U.S. PATENT DOCUMENTS

| | | | |
|---|---|---|---|
| 518,013 | 4/1894 | Thayer | 43/17 |
| 1,443,981 | 2/1923 | Eccleston | 43/17 |
| 1,451,124 | 4/1923 | Stolze | 43/16 |
| 1,741,253 | 12/1929 | Skelton | 43/17 |
| 1,870,782 | 8/1932 | Minutilli | 43/16 |
| 4,043,070 | 8/1977 | Lamothe | 43/17 |
| 4,253,262 | 3/1981 | Johnson | 43/17 |
| 4,270,297 | 6/1981 | Yates | 43/17 |

FOREIGN PATENT DOCUMENTS 665444  6/1963  Canada ..................................... 43/17

Primary Examiner—Gene P. Crosby
Attorney, Agent, or Firm—W. R. Hulbert

[57] ABSTRACT

Rig for ice fishing comprising a tripod-mounted ring supporting a windlass having a shaft which spans a diameter of the ring and which caries a reel for rotation therewith. The legs can be folded against the bottom of the ring for storage and transportation. An anti-freeze tube through which the line may be unreeled extends beneath the ring. A spring-steel flag-staff is mounted in such a way on the ring that it can be partially wrapped around the ring for storage and can be swung upwardly and arcuately flexed across the top of the ring for use. The free end of the staff can be hooked to a bend in an end of the shaft so as to be released and signal the fisherman if a fish takes the line and thereby revolves the shaft.

5 Claims, 3 Drawing Figures

ICE FISHING DEVICE

The present invention relates to the art of ice fishing and more particularly concerns an improved ice fishing rig.

BACKGROUND OF THE INVENTION

Over the years various devices have been developed to make ice fishing easier. In general they comprise some sort of support for positioning a fish reel either above a hole in the ice so the line can descend through it or submerged below the water beneath the hole. The prior art devices are also usually provided with some sort of signaling device to signal that a fish has taken the bait. Some provide means for preventing freezing up of the line during use. Examples indicating the state of the art include U.S. Pat. Nos. 2,955,374; 1,451,124; 1,870,782; 2,122,841; 3,010,238 and 2,791,857.

It is an object of the invention to provide an improved ice fishing rig which will stably support itself over the hole, be foldable for transportation and storage, resist freeze-up of the line and reel and display a visual signal when the line is taken.

SUMMARY OF THE INVENTION

In accordance with the invention there is provided an ice fishing rig for fishing through a hole in the ice comprising a mounting ring of suitable diameter; at least three legs hinged to the ring so as to be movable between a folded position adjacent the plane of the ring for storage and transportation to a spread downwardly depending position for supporting the rig on the surface of the ice straddling the hole; a windlass unit mounted on the ring with its horizontal shaft extending across its diameter and revolving in bushings thereon, said shaft adapted to receive a fishing line reel for revolving therewith; a springy flag-staff held by one end on one side of the ring; and means on one end of the shaft for releasably retaining the free end of the staff on the other side of said ring when it is flexed across the ring and adapted to release the same when the shaft is revolved whereby, after the fishing line is set, the springy staff may be releasably held in its flexed position subject to release and springing upright when a fish takes the line and thereby revolves the shaft.

In preferred embodiments the means for releasably retaining the free end of the staff comprises a double bend formed in the end of the shaft so that the free end of the staff may be held in one of the bends for quick release and in the other for more delayed release; a yoke is supported by the shaft and adapted to swing from a stored position against the bottom of the ring to a depending position over the hole in the ice and an anti-freezing tube is held by the yoke through which the fish-line may extend into the water; the flag-staff comprises a piece of flat spring steel pivotally secured to one side of the ring so that it can be swung from a stored position wrapped around the perimeter of the ring to an upright position in which it can be flexed over the upper side of the ring with its free end engaged by the release means; means are provided for releasably retaining the legs and the flag-staff in their stored positions; and spikes are provided on the ends of the legs for engaging the ice around the fishing hole.

Still further objects, features and advantages of the invention will be apparent from the following non-limiting description of a presently preferred embodiment taken in conjunction with the accompanying drawings.

DETAILED DESCRIPTION OF PREFERRED EMBODIMENT

Figure 1:
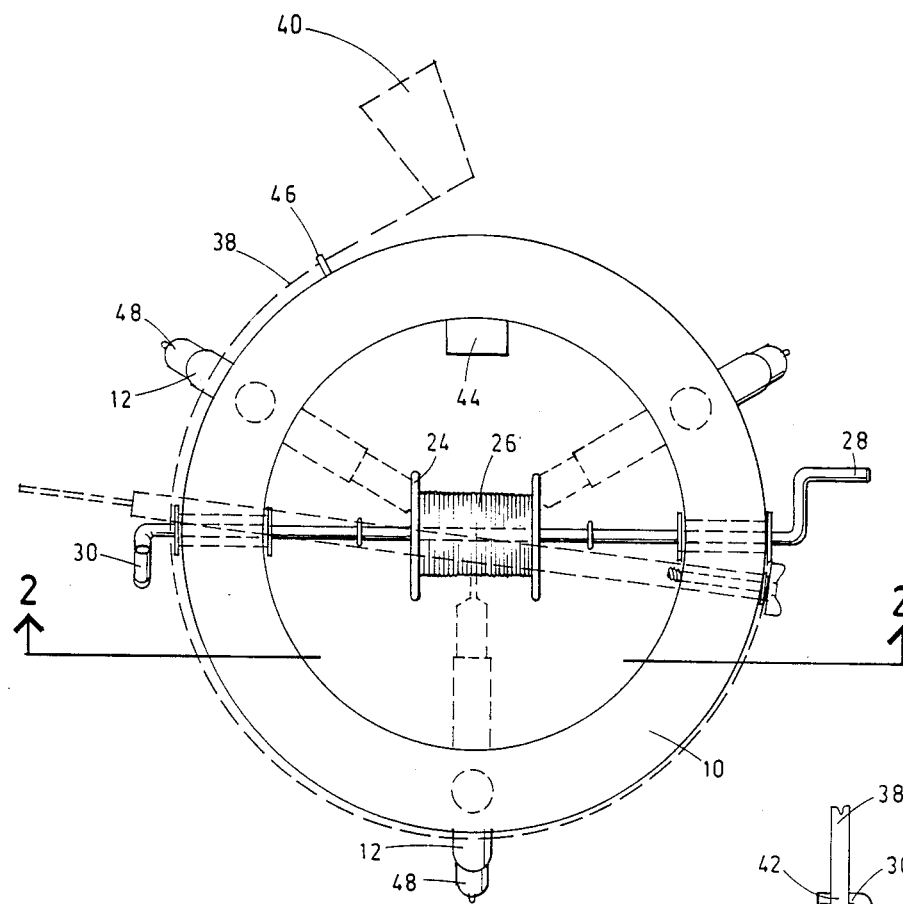
FIG. 1 is a plan view of the novel ice fishing rig with the supporting legs spread but the signal device in stored position.
Figure 3:
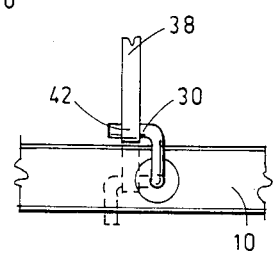
FIG. 3 is a fragmentary detail view of the two-position flag release mechanism.
Figure 2:
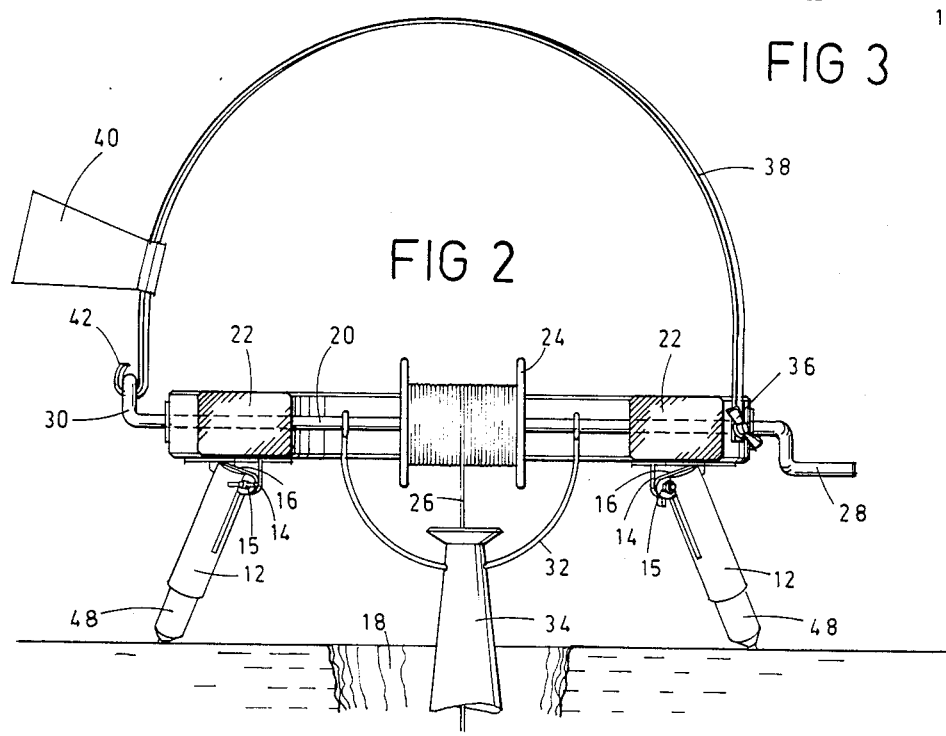
FIG. 2 is a vertical section taken on line 2—2 of FIG. 1 but showing the flag-staff in its armed position.

The various elements of the novel rig are supported on a main frame comprising a ring 10 of wood or plastic. The ring 10 is provided with three folding legs 12 which are hinged at 14 so as to be foldable inwardly against the bottom of the ring for storage and transportation as indicated by broken lines in FIG. 1. The hinge members 14 are provided with angled surfaces adapted to engage the top surfaces 16 of the legs so as to provide stops to hold the legs at the desired spread position for stabilizing the ring when set on ice over a fishing hole 18. Wing nuts 15 serve to clamp the legs in either position.

Crossing the diameter of the ring 10 is a windlass comprising a main shaft 20 rotatably held in suitable bushings 22 on opposite sides of the ring 10. The bushings preferably are made of suitable metal or plastic and are inserted in suitable bores in opposite sides of the ring 10 with their axes aligned to receive the shaft 20. Mounted to revolve with the shaft 20 is a reel 24, preferably of aluminum, on which is wound the fishing line 26. The shaft 20 is provided at one end with a crank 28 extending outboard of the circumference of the ring. The other end of the shaft protrudes from the opposite side of the device and is doubly bent to provide a two-position flag release 30 for a purpose which will be described.

Suspended beneath the center of the ring is a yoke 32 which supports anti-line freezing tube 34 which, when in use, descends at least part way into the hole in the ice and beneath the surface of the water. The tube 34 is preferably composed of suitable tough, light-weight plastic and serves to prevent freeze-up of the depending fish line. The yoke and tube may be swung against the bottom of the ring and held in stored position by the folded legs.

Fastened to one side of the periphery of the ring 10 by a wing-nut 36 is a springy flag staff 38 comprising a piece of flat spring steel. The free end of the spring steel staff carries a fluorescent plastic signal flag 40 and is provided with a hook 42 adapted to engage and be held by one of the two bends provided in hook 30 in one end of shaft 20. Mounted at a suitable location on the inner periphery of ring 10 is a rubber fish-hook anchor 44. For transportation and storage the springy flag-staff may be stored partially around the periphery of the ring. This is accomplished by loosening wing-nut 36, swinging the spring steel into the plane of the ring and then wrapping it partially around the ring where it is held by suitable brackets 46.

Each of the legs 12 is provided with a metal spike or cleat 48 to dig into the surface of the ice and maintain the stability of the rig when in use. The upper portion of each leg is covered by a metal housing comprising a portion of the hinge which permits locking the legs in either open or closed position by means of wing nuts 15.

This is accomplished by loosening wing nuts 15 and swinging the legs to the desired position and retightening the nuts.

In use, the rig is taken to the hole in the ice where it is to be used. The legs are spread and the device set over the hole as shown, supported by the legs. The yoke 32 is swung down to hold the tube 34 partially submerged within the hole. The fish-hook is baited and line 26 run out from the reel 24 through the tube 34 into the water. The springy flag-staff 38 is then swung to its vertical position and armed by being bent over the top of the ring so as to engage the hook 42 at its free end one of the two bends on the end 30 of the main shaft 20. With the main shaft in one position the staff is arranged for quick release; in another position the release requires greater rotation of the shaft to effect the release. Once the device is set the fisherman may retreat to a fishing shack or elsewhere to keep warm while waiting for a bite. If a fish takes the line the flag is at once released and waves back and forth to provide a visual signal to the fisherman.

There is herein disclosed and described a presently preferred embodiment of the invention. It should be understood that it is intended that the scope of the invention be limited only by the proper interpretation of the appended claims.

I claim:

1. Ice fishing rig for fishing through a hole in the ice comprising a mounting ring of suitable diameter at least three legs hinged to said ring so as to be movable between a folded position adjacent the plane of the ring for storage and transportation to a spread downwardly depending position for supporting the rig on the surface of the ice straddling said hole a windlass unit mounted on said ring with its horizontal shaft extending across its diameter and revolving in bushings thereon said shaft adapted to receive and support a fishing line reel for revolving therewith a springy flag-staff held by one end on one side of said ring means on one end of said shaft for releasably retaining the free end of said staff on the other side of said ring when it is flexed across said ring and adapted to release the same when said shaft is revolved said means for releasably retaining the free end of said staff comprises a first and second bend formed in the end of said shaft said first bend holding said free end of said staff for quick release, said second bend holding said free end of said staff for more delayed release whereby, after the fishing line is set, said springy staff may be releasably held in its flexed position subject to release and springing upright when a fish takes the line and thereby revolves said shaft.

2. A rig as claimed in claim 1 including a yoke supported by said shaft and adapted to swing from a stored position against the bottom of said ring to a depending position over the hole in the ice and an anti-freezing tube held by said yoke and through which the fishline may extend into the water.

3. A rig as claimed in claim 1 wherein said flag-staff comprises a piece of flat spring steel pivotally secured to one side of said ring so that it can be swung from a stored position wrapped around the perimeter of said ring to an upright position in which it can be flexed over the upper side of said ring with its free end engaged by said release means.

4. A rig as claimed in claim 3 including means for releasably retaining said legs and said flag-staff in their stored positions.

5. A rig as claimed in claim 1 including spikes on the ends of said legs for engaging the ice around the fishing hole.

* * * * *